Patented Jan. 25, 1949

2,460,035

UNITED STATES PATENT OFFICE 2,460,035

SYNTHETIC LUBRICANT

Dilworth T. Rogers, Summit, and Jeffrey H. Bartlett, Westfield, N. J., assignors to Standard Oil Development Company, a corporation of Delaware No Drawing. Application January 25, 1946, Serial No. 643,464

16 Claims. (Cl. 260—485)

This invention relates to synthetic lubricating oils which are suitable particularly for use as aviation lubricants because of the low pour points exhibited by the new products herein described.

The compositions which have been found to be particularly adapted for use as lubricants in accordance with the present invention are obtained by the polymerization of certain esters of maleic and fumaric acids, these being the two isomeric forms of the unsaturated aliphatic dicarboxylic acid having the structure

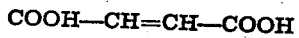

Such esters are derived by the esterification of the dicarboxylic acids with primary or secondary saturated straight chain aliphatic monohydroxy alcohols or the corresponding mercaptans, and similar alcohols or mercaptans, containing alkyl groups with oxygen atoms interlinked between carbon atoms, as in ethers of ethylene glycol, and in diethylene glycol, and the like. A suitable polymeric product may be formed by polymerizing the simple esters of the type described above or mixed esters, containing different alkyl or oxygen-containing alkyl groups, or by copolymerizing different esters present in a mixture of two or more of the aforesaid esters, provided that in the simple or mixed ester, or mixture of esters, the esterifying groups have not more than 10 carbon atoms each and an average of about 3 to about 10 carbon atoms each. In other words, the new compositions of the present invention are obtained by the polymerization of material having the structure

where R and R' are straight chain alkyl groups or straight chain alkyl groups containing at least one oxygen atom interlinked between carbon atoms, all of such groups having a maximum of 10 carbon atoms, the average length of the groups being about 3 to about 10 carbon atoms.

A particularly suitable class of esters falling within the above general definition are the di-n-alkyl esters of fumaric and maleic acids, and the most preferred among these are the esters having 4 to 8 carbon atoms in each alkyl group.

If the polymerization reaction is controlled by using the low concentrations of catalyst and the temperatures and times of reaction specified below, polymer oils having viscosities in the lubricating oil range, i. e., from about 45 to about 200 seconds Saybolt at 210° F., and having viscosity indices of at least 120 and pour points ranging from −20° to −70° F. or below, may be obtained.

The esters which are employed in accordance with this invention are most conveniently prepared by reacting the maleic or fumaric acid directly with an alcohol of the type described above, e. g., n-butyl alcohol, n-hexyl alcohol, n-octyl alcohol, sec.-butyl alcohol, hexanol-2, heptanol-2, the ether of ethylene glycol, or diethylene glycol. Mercaptans may be employed in place of the alcohols, but in such case it may be more convenient to first form an acid chloride and then react this with the mercaptan.

The ester may be polymerized by any suitable method, but the use of catalysts, such as benzoyl peroxide, sulfuric acid, boron fluoride, hydrogen fluoride, aluminum chloride, triethyl lead acetate, activated clay, activated alumina, etc., is preferred. The conditions of polymerization required to produce a product of the desired viscosity will vary with the different olefinic dicarboxylic esters. In general, high temperatures and low percentages of catalysts yield polymers of low molecular weight. The presence of a diluent also decreases the molecular weight. In most cases, a temperature of 75° to 150° C. is satisfactory with or without a diluent and with a catalyst concentration of about 0.1% to about 2.0%. In some cases heating alone will bring about the desired polymerization reaction, and in such cases a temperature of 150° to 300° C. will generally be required. The period of heating required in the presence or absence of the catalyst will generally range from about 5 to about 60 hours, or even higher, but a period of 8 to 30 hours is generally preferred.

The olefinic dicarboxylic esters of the present invention are generally not quantitatively converted to polymers during one reaction. As a result, it is often desirable to extract the monomer from the product or to progressively feed in catalyst during the reaction so that the final product is entirely composed of polymer. Extraction is desirable to produce a product of high viscosity, and the pour point is correspondingly reduced. For extracting the monomer, it has been found that methanol or a mixture of methanol and water is satisfactory. Other alcohols as well as other typical organic solvents may also be used.

The lubricating oils produced in accordance with the present invention may be used not only as crankcase lubricants but also in the formulation of greases, hydraulic media, and the like. In all of these compositions it is desirable to include an antioxidant, such, for example, as di tert. - butyl - p - cresol, hydroquinone, phenyl-α- naphthylamine, p-tert.-amyl phenol sulfide, or the like. It will also be found advantageous to include detergent type additives for heavy duty service. Although the synthetic oils of the present invention possess of themselves high viscosity indices, it may sometimes be desirable to add any of the known viscosity index improvers and thickeners if still higher viscosity indices are required.

The following examples illustrate methods of preparation of the compositions of the present invention and the properties of the products, but such examples are to be considered as illustrative only and not as limiting the scope of the invention in any way.

Example 1

In a reaction vessel 50 parts by weight of di-n-hexyl fumarate and 50 parts of n-heptane were heated to 80° C. and the air replaced with nitrogen. Then 0.5 part of benzoyl peroxide was added and the mixture agitated for a period of nearly 16 hours at 80° C. After removal of the diluent by evaporation, the polymer product was recovered and found to possess the properties shown in the table below. For purposes of comparison, the corresponding properties of a number of monomeric esters are shown in the table.

|  | Di-2-Ethyl Hexyl Sebacate | Di-n-Decyl $C_5$–$C_{10}$ Alkenyl Succinate [1] | Di-n-Hexyl Fumarate Monomer | Di-n-Hexyl Fumarate Polymer |
|---|---|---|---|---|
| Viscosity Saybolt at 100° F | 66.8 | 103.0 | 48.9 | 339.2 |
| Viscosity Saybolt at 210° F | 37.3 | 40.7 | 33.2 | 70.1 |
| Viscosity Index | 151 | 135 |  | 146 |
| A. S. T. M. Pour Point, °F | −90 | −45 | 0 | −55 |
| Sp. Gr. at 20° C | 0.910 |  | 0.95 | 0.984 |

[1] Prepared by condensing a $C_8$–$C_{10}$ olefin mixture with maleic anhydride and esterifying the product with n-decyl alcohol.

Example 2

125 parts by weight of di-n-hexyl fumarate was introduced into a reaction vessel and heated to 120° C. while the air was replaced with nitrogen. To this was added 0.3125 part (0.25%) of benzoyl peroxide and the mixture was shaken and returned to the 120° C. bath for 16 hours. 100 parts by weight of this polymer was extracted with about 800 parts of 94% aqueous methanol at room temperature, leaving a layer of polymer which after heating to remove the solvent showed a yield of 33.5 parts of extracted polymer. The following table shows the properties of the polymer before and after extraction with the methanol.

|  | Crude Polymer | Extracted Polymer |
|---|---|---|
| Viscosity Saybolt at 100° F | 84.1 | 657 |
| Viscosity Saybolt at 210° F | 39.7 | 104.6 |
| Viscosity Index | 170 | 139 |

The material which was extracted by means of the methanol was found to be substantially pure di-n-hexyl fumarate monomer.

Example 3

30 parts by weight of n-propyl fumarate was heated at 100° C. with 0.075 part of benzoyl peroxide (0.25%) for 16 hours in a vessel in which the air was replaced with nitrogen. The product at the end of the heating period exhibited the following properties:

Viscosity (Saybolt) at 100° F_____sec__ 270.5
Viscosity (Saybolt) at 210° F_____sec__ 64.7
Viscosity index _____ 152

Example 4

50 parts by weight of n-butyl fumarate was heated at 80° C. with 0.25 part of benzoyl peroxide (0.5%) for 16 hours in a vessel in which the air was replaced with nitrogen. The product exhibited the following properties:

Viscosity (Saybolt) at 100° F_____ 224.6
Viscosity (Saybolt) at 210° F_____ 55.3
Viscosity index _____ 145

Example 5

50 parts by weight of n-octyl fumarate was heated at 80° C. for 16 hours with 0.25 part of benzoyl peroxide (0.5%) in a vessel in which the air was replaced with nitrogen. The product exhibited the following properties:

Viscosity (Saybolt) at 100° F_____ 1248.8
Viscosity (Saybolt) at 210° F_____ 184.3
Viscosity index _____ 135

Example 6

30 parts by weight of n-decyl fumarate was heated at 100° C. for 16 hours with 0.075 part of benzoyl peroxide (0.25%) in a vessel in which the air was replaced with nitrogen. The product exhibited the following properties:

Viscosity (Saybolt) at 100° F_____ 531.3
Viscosity (Saybolt) at 210° F_____ 96.0
Viscosity index _____ 151

This invention is not to be considered as limited by any of the examples which are inserted for purposes of illustration, but is to be limited solely by the terms of the appended claims.

We claim:

1. A normally liquid composition having lubricating properties, consisting essentially of a product of the polymerization of material having the structure—

where R and R' are straight chain alkyl groups, having not more than 10 carbon atoms each, and where the average chain length of the said groups in the unpolymerized material is from 3 to 10 carbon atoms.

2. A composition according to claim 1 in which the unpolymerized material consists of di-n-alkyl esters.

3. A composition according to claim 1 in which the unpolymerized material consists of di-n-alkyl esters having 4 to 8 carbon atoms in each ester group.

4. A normally liquid composition having lubricating properties and consisting essentially of a polymerized di-n-alkyl ester of fumaric acid, where each alkyl group contains 4 to 8 carbon atoms.

5. A composition according to claim 4 in which the unpolymerized ester is di-n-butyl fumarate.

6. A composition according to claim 4 in which the unpolymerized ester is di-n-hexyl fumarate.

7. A composition according to claim 4 in which the unpolymerized ester is di-n-octyl fumarate.

8. The method of preparing a synthetic polymeric product having lubricating properties which comprises heating material having the structure—

ROOC—CH=CH—COOR' where R and R' are straight chain alkyl groups, having not more than 10 carbon atoms each, and where the average chain length of the said groups in the said material is from 3 to 10 carbon atoms, at a temperature of about 75° to about 150° C. in the presence of about 0.1% to about 2.0% by weight of a polymerization catalyst for a period of about 5 to about 60 hours.

9. A method according to claim 8 in which the polymerization catalyst is benzoyl peroxide.

10. A method according to claim 8 in which the unpolymerized material is a di-n-alkyl ester.

11. A method according to claim 8 in which the unpolymerized material is a di-n-alkyl ester containing 4 to 8 carbon atoms in each alkyl group and in which the polymerization catalyst is benzoyl peroxide.

12. A method according to claim 8 in which the unpolymerized material is a di-n-alkyl ester having 4 to 8 carbon atoms in each alkyl group and in which the heating is continued for a period of about 8 to about 30 hours.

13. A method according to claim 8 in which the unpolymerized material is a di-n-alkyl ester having 4 to 8 carbon atoms in each alkyl group, in which the heating is continued for a period of about 8 to 30 hours, and in which the polymerization catalyst is benzoyl peroxide.

14. The method of preparing a polymer of di-n-butyl fumarate having a viscosity of about 55 to 56 seconds Saybolt at 210° F. and a viscosity index of about 145 which comprises heating di-n-butyl fumarate in the presence of about 0.5% benzoyl peroxide at about 80° C. for about 16 hours.

15. The method of preparing a polymer of di-n-hexyl fumarate having a viscosity of 70 to 71 seconds Saybolt at 210° F. and a viscosity index of about 146 which comprises heating a mixture of about 50 parts by weight of di-n-hexyl fumarate and about 50 parts by weight of n-heptane at about 80° C. in the presence of about 0.5 part of benzoyl peroxide for about 16 hours and removing the said n-heptane from the product.

16. The method of preparing a polymer of di-n-octyl fumarate having a viscosity of about 184 to 185 seconds Saybolt at 210° F. and a viscosity index of about 135 which comprises heating di-n-octyl fumarate in the presence of about 0.5% benzoyl peroxide at about 80° C. for a period of about 16 hours.

DILWORTH T. ROGERS.
JEFFREY H. BARTLETT.

REFERENCES CITED

The following references are of record in the file of this patent:

UNITED STATES PATENTS

| Number | Name | Date |
| --- | --- | --- |
| 1,945,307 | Dykstra | Jan. 30, 1934 |
| 2,107,316 | Wiezevich | Feb. 8, 1938 |
| 2,196,670 | Eichwald | Apr. 9, 1940 |
| 2,260,417 | Whiteley | Oct. 28, 1941 |
| 2,375,516 | Blair | May 8, 1945 |

FOREIGN PATENTS

| Number | Country | Date |
| --- | --- | --- |
| 428,993 | Great Britain | 1934 |

OTHER REFERENCES

Hibben—"Jour. Chem. Phys." vol. 5 (1937), pp. 706–710.